United States Patent [19]
Bleiweiss et al.

[11] Patent Number: 5,841,997
[45] Date of Patent: Nov. 24, 1998

[54] APPARATUS FOR EFFECTING PORT SWITCHING OF FIBRE CHANNEL LOOPS

[75] Inventors: Scott Bleiweiss, Upton; Brian Gallagher, Marlboro, both of Mass.

[73] Assignee: EMC Corporation, Hopkinton, Mass.

[21] Appl. No.: 536,686

[22] Filed: Sep. 29, 1995

[51] Int. Cl.[6] ........................................ G06F 1/32
[52] U.S. Cl. .......................... 395/311; 395/311; 395/280; 395/200.3; 395/750.1; 364/248; 364/952.1; 360/78.12; 360/98.1
[58] Field of Search ...................................... 395/311, 425, 395/200.3, 280, 800, 182.02, 375, 750.01; 364/200, 900; 371/10.1, 10.2, 8.1; 360/78.12

[56] References Cited

U.S. PATENT DOCUMENTS

| | | | |
|---|---|---|---|
| 3,725,864 | 4/1973 | Clark et al. ........................... | 340/172.5 |
| 4,092,732 | 5/1978 | Ouchi ..................................... | 364/200 |
| 4,807,184 | 2/1989 | Shelor ..................................... | 364/900 |
| 4,890,174 | 12/1989 | Chalmers et al. .................... | 360/78.12 |
| 4,914,656 | 4/1990 | Dumphy, Jr. et al. ................ | 371/10.2 |
| 5,058,004 | 10/1991 | Ravid ..................................... | 364/200 |
| 5,072,378 | 12/1991 | Manka ..................................... | 395/575 |
| 5,140,592 | 8/1992 | Idleman et al. ........................ | 371/8.1 |
| 5,148,432 | 9/1992 | Gordon et al. ......................... | 371/10.1 |
| 5,182,801 | 1/1993 | Asfour .................................... | 395/425 |
| 5,206,939 | 4/1993 | Yanai et al. ............................ | 395/400 |
| 5,206,943 | 4/1993 | Callison et al. ....................... | 395/425 |
| 5,229,919 | 7/1993 | Chen ..................................... | 361/391 |
| 5,235,689 | 8/1993 | Baker et al. ........................... | 395/425 |
| 5,327,023 | 7/1994 | Kawana et al. ....................... | 307/465 |
| 5,394,526 | 2/1995 | Crouse et al. ......................... | 395/200 |
| 5,487,155 | 1/1996 | Drewry et al. ........................ | 395/311 |

*Primary Examiner*—Meng-Ai T. An
*Assistant Examiner*—Eric S. Thlang
*Attorney, Agent, or Firm*—Fish & Richardson P.C.

[57] ABSTRACT

A fibre channel disk drive operating system configures a plurality of disk drives into a fibre channel drive loop. The system also provides plurality of disk drive controllers, and a software controlled switching circuit electrically connecting the disk drive controllers to the disk drives which are arranged in the fibre channel drive loop in varying selected configurations. The switching circuit has a plurality of switch elements arranged for selectively electrically connecting each fibre channel drive loop to a selected controller. Each switch element in a first mode of operation passes electrical signals in a through direction and in a second mode of operation passes electrical signals in a second bypass direction. Thereby each fibre channel drive loop is electrically connected to a selected one of disk drive controllers prior to operation of the system.

7 Claims, 4 Drawing Sheets

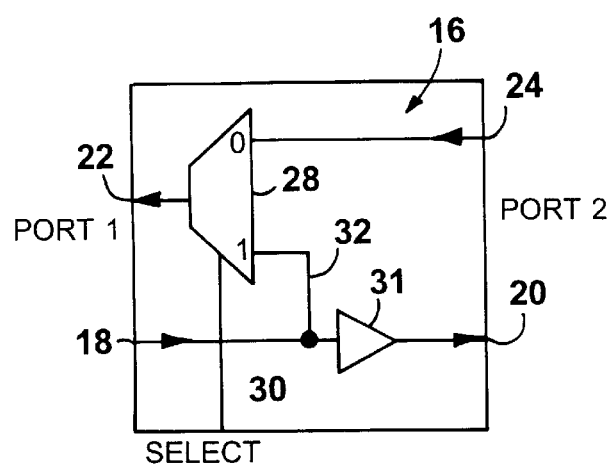 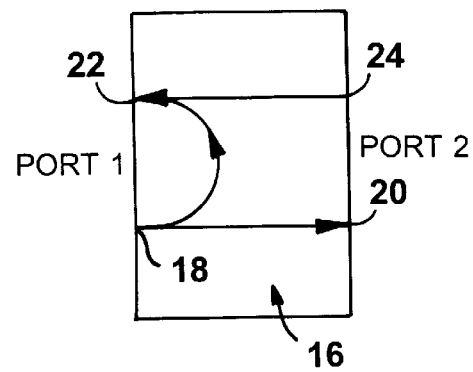
FIG. 2A                    FIG. 2B

APPARATUS FOR EFFECTING PORT SWITCHING OF FIBRE CHANNEL LOOPS

The invention relates generally to high speed interconnect channels between disk drives and disk drive controllers, and in particular to a high speed interconnect channel used as the backend interconnection between disk drives and disk drive controllers.

BACKGROUND OF THE INVENTION

It is desirable and beneficial to have a flexible mapping of disk drives in order to support system expansion, modularity, and configuration flexibility. For example, one system might employ two disk drive controllers to control 64 disk drives, and at a later date, the same system may be upgraded to include four disk drive controllers to improve performance. It is desirable to distribute the disk drives evenly across the controllers in order to balance the work load; and this redistribution would likely require some of the disk drives to be remapped both logically and physically to new disk drive controllers. The bandwidth of the fibre channel signals, which is greater than one gigabit per second, makes it impossible to use some of the conventional techniques for providing system configuration flexibility. Thus, all fibre channel connections must be run on dedicated point to point links, traditional multidrop buses, such as used in SCSI, are not an option. Further, coaxial cables could be used to route the connections between the disk drives and the disk drive controllers. All these connections can be easily reconfigured manually as the system configuration is upgraded, for example as is done with an audio patch panel. The resulting manual changes are laborious to implement and can often result in what might be described as a rat's nest of cables. Another possible solution is to fix the configuration between disk drive controllers and disk drives thus eliminating the need for a flexible interconnection. This approach, however, would limit the ability of a system to add disk drive controllers to only those times when it needed more disk drives (and vice versa).

The primary object of the invention, therefore, is to enable a system of disk drives and disk drive controllers to be configured electronically, to allow upgrading of the system with disk drives and disk drive controllers independently as required by an application being used, and to enable all high speed fibre channel signals to remain within a cabinet enclosure, thereby resulting in increased reliability and reduced cost.

SUMMARY OF THE INVENTION

The invention relates generally to a fibre channel disk drive storage sub-system having a plurality of disk drives arranged in a plurality of channel loops and a plurality of disk drive controllers. The invention features a software controlled switching circuit electrically connecting the disk drive controllers to the fibre channel loops in varying selected configurations prior to operation of the system. The switching circuit features a plurality of switch elements arranged in a matrix-like configuration having controller loops connected to the drive controllers and drive loops connected to the channel loops, for selectively electrically connecting under software control each drive loop to a selected controller loop. Each switch element, in a first mode of operation, passes electrical communication signals in a first through direction and in a second mode of operation, passes the electrical communications signals in a second bypass direction whereby each drive loop is electrically connected to a selected one of the disk drive controllers.

In a preferred embodiment, each switch element has a first and a second loop resiliency circuit, the circuits of a switch element being connected back to back with their bypass connections being connected in a series bypass configuration with one of said controller loops and one of said drive loops.

In a more general aspect of the invention, a fibre channel communications sub-system relates to a plurality of channel devices arranged in a plurality of channel loops. The sub-system also has a plurality of channel controllers. The sub-system features a software controlled switching circuit electrically connecting the channel controllers to the fibre channel loops in the selected circuit configurations. The switching circuit features a plurality of switch elements arranged in a matrix-like configuration having controller loops connected to the channel controllers and drive loops connected to the channel devices, for selectively electrically connecting, under software control, each drive loop to a selected controller loop. Each switch element, in a first mode of operation, passes electrical communication signals in one through direction, and in a second mode of operation passes electrical communication signals in a second bypass direction. Thereby, each drive loop is electrically connected to a selected one of the disk drive controllers.

In a further aspect of the invention, it is well known that many channel devices, in particular disk drives, will have two ports. This enables a fault tolerant sub-system to be constructed, which advantageously increases reliability of the circuitry. In such an instance, the invention features connecting each of the second ports of the disk drives to drive loops which are in turn connected selectively to the same or different controllers through the software controlled switching circuitry.

BRIEF DESCRIPTION OF THE DRAWINGS

Other objects, features, and advantages of the described particular embodiments of the invention will be apparent from the-drawings in which:

FIGS. 2A and 2B are more detailed schematic and logical diagrams, respectively, of LRC function in accordance with the invention;

DESCRIPTION OF THE PREFERRED EMBODIMENTS

While the invention is described, in particular, with regard to disk drives connected to a fibre channel drive loop, the invention can also be used, more generally, in connection with other electronic devices which connect to a channel loop. These devices, for example personal computers, work stations, and other network type devices, connect and operate in a manner similar to that of a disk drive. For purposes of clarity and consistency in the description that follows, only the application using disk drives and disk drive controllers will be described.

Figure 1:
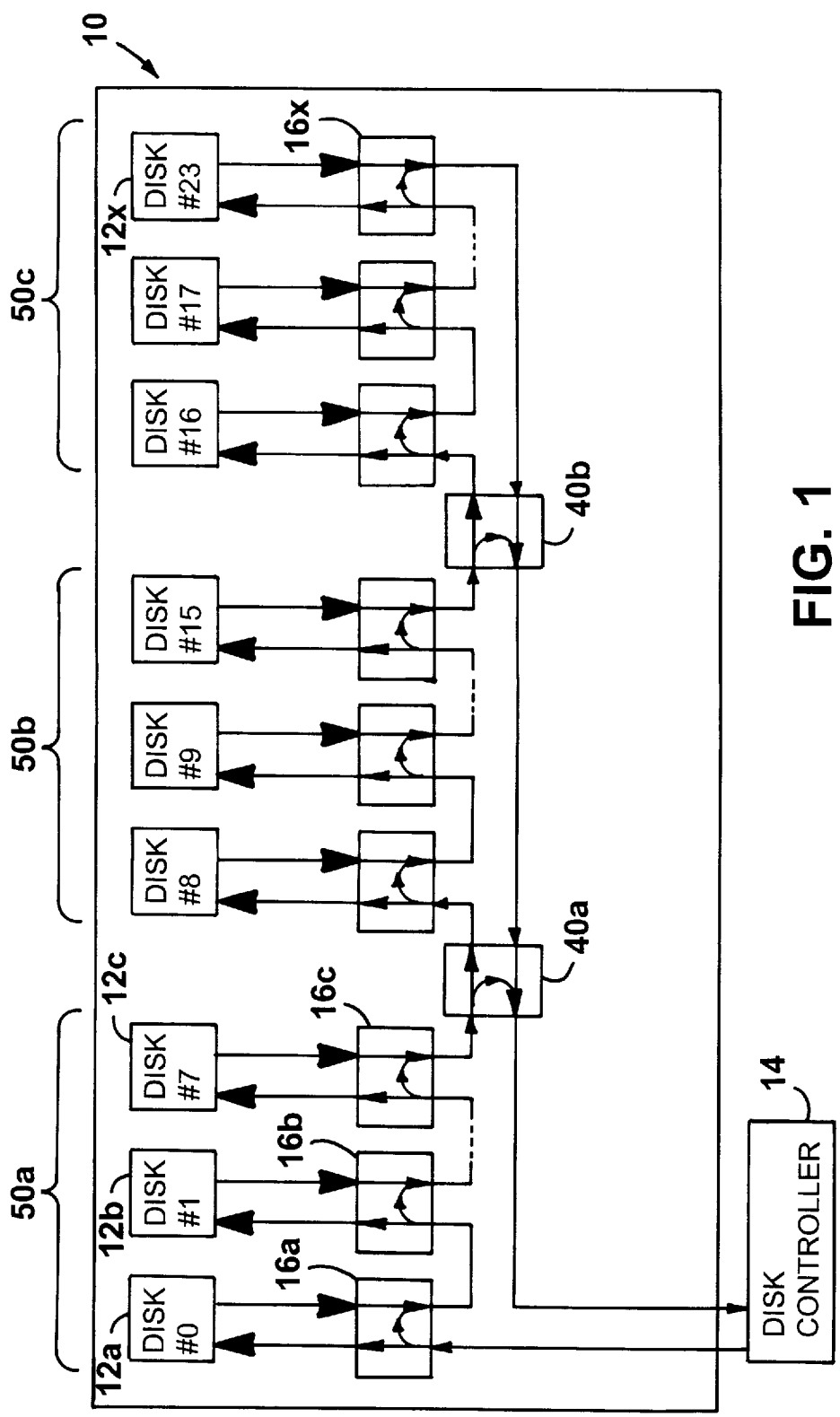
FIG. 1 is a block diagram of a typical fibre channel disk loop.

Referring to FIG. 1, a fibre channel disk loop 10 has a plurality of disk drives 12a, 12b, . . . , 12x each connected for electrical communications to one or more disk controllers 14 through associated bypass switching elements 16a, 16b, . . . , 16x. The bypass switches, in a preferred embodiment of the invention, are loop resiliency circuits (LRC's) which act as a multiplexing switch.

Referring to FIGS. 2A and 2B, there is illustrated, respectively, a schematic representation of the operation of an LRC (FIG. 2A) as well as its logical operation (FIG. 2B). In a first, through mode of operation, referring to FIG. 2B, an LRC 16 receives an input at an input port 18 and transmits it to an output port 20. In a second mode of operation, the LRC, in addition, transfers the input on line 18 to a second output port 22 which provides a bypass of all of the circuitry connected to port 2 of the switch. In this second, bypass mode of operation, any input signals appearing at port 2 on node 24 are ignored and are not passed through to node 22 of port 1.

Referring to FIG. 2A, an electrical schematic is provided in which a typical multiplexing device 28 operates in response to a select path switch line at node 30. At all times, the input at node 18 is passed through a non-inverting amplifier 31 to node 20. However, depending upon the value of the select line at node 30, multiplexer 28 selects either the input from node 24 or the input available to it from node 18 over a line 32 and provides that selected input to the output, port 1, at node 22.

Referring again to FIG. 1, each of the disk drives 12 is interfaced to the fibre channel loop through an LRC 16. In the illustrated embodiment, each drive has a dedicated LRC associated with it so that the fibre channel loop will remain operable even though a disk drive fails to operate or is removed from its slot. The chains of LRC's under these circumstances, that is, operating in a bypass mode, can become quite long in those instances where many disk drives are either removed, fail, or the corresponding slot is not used because it is not necessary for the particular configuration.

Each LRC which is operated in a bypass mode introduces a small amount of jitter into the signals which pass through it. That jitter can thus accumulate, and if too great, causes reliability and accuracy problems which adversely impact the operation of the loop. The disk drives which are installed on the loop, and which are operative to receive signals from the loop, will retime the signal which it receives thus removing any jitter which has been accumulated up to that point.

Thus, the number of LRC's operating in a bypass mode must be limited to a reasonable number. This function is effected by placing intermediate bypass loop switches, that is, intermediate bypass LRC's, periodically along the disk fibre channel loop. These bypass LRC's, operating together with sequential disk loading on the chain, effectively prevent significant jitter accumulation on the loop.

Accordingly, in the illustrated embodiment, a plurality of intermediate bypass LRC's 40a, 40b, divide the fibre channel loop into logical segments. These segments are each self contained loops of fibre channel ports and a segment can operate whether the next successive segment, that is, the next segment further from the disk controller, such as segment 50b in comparison to segment 50a, is either operable or present. This allows for modularity within the fibre channel disk loop as segments can be added to, or removed from, the loop.

In operation, the bypass switches are used to bypass either unused or inoperative disk slots as shown in FIG. 1, and to provide modular expansion as provided by the intermediate bypass switches 40. In one embodiment, the disk drives are added to the fibre channel loop beginning with disk slot zero and proceeding upwards in count. In the configuration illustrated in FIG. 1, there will never be more than eight successive bypassed LRC's in any configuration. If there is only a single disk installed in slot zero, the signal must propagate through the bypassed LRC's for slots one through seven (for example 16b, ..., 16c), and then through the bypass intermediate LRC 40a located between slots 7 and 8 from which it returns back to the disk controller. When more than 8 disks are installed, the intermediate LRC 40a, between disk slots 7 and 8, is set to the through mode and disk slots 8–15 are added to the loop.

A further optimization can be made to reduce the number of bypassed LRC's which must be traversed. In accordance with this method, each disk subloop segment, that is, subloop 50a, 50b, 50c, is loaded from its middle. A single disk is thus installed first at slot 4 (as opposed to slot 0) which would require that only 4 bypassed LRC's are traversed as opposed to 8 when the first disk is loaded at disk slot 0. A nominal loading sequence, identified by slot numbers, could be; 4, 3, 5, 2, 6, 1, 7, 0. This sequence can be designed into the system so that the disk slots can be arranged physically in a simple left to right order.

Figure 3:
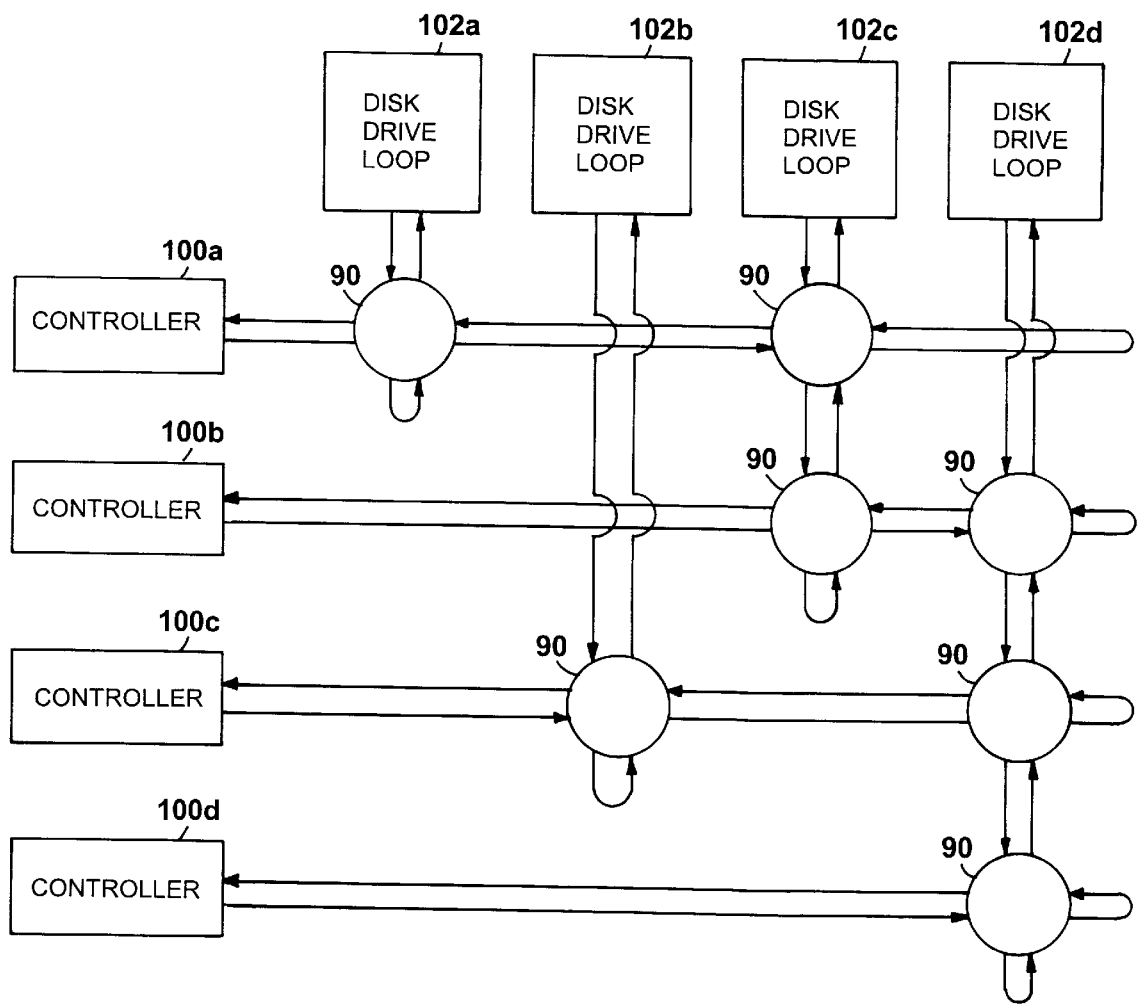
FIG. 3 is a representation of a fibre channel switch network in accordance with a particularly preferred embodiment of the invention.
Figure 4:
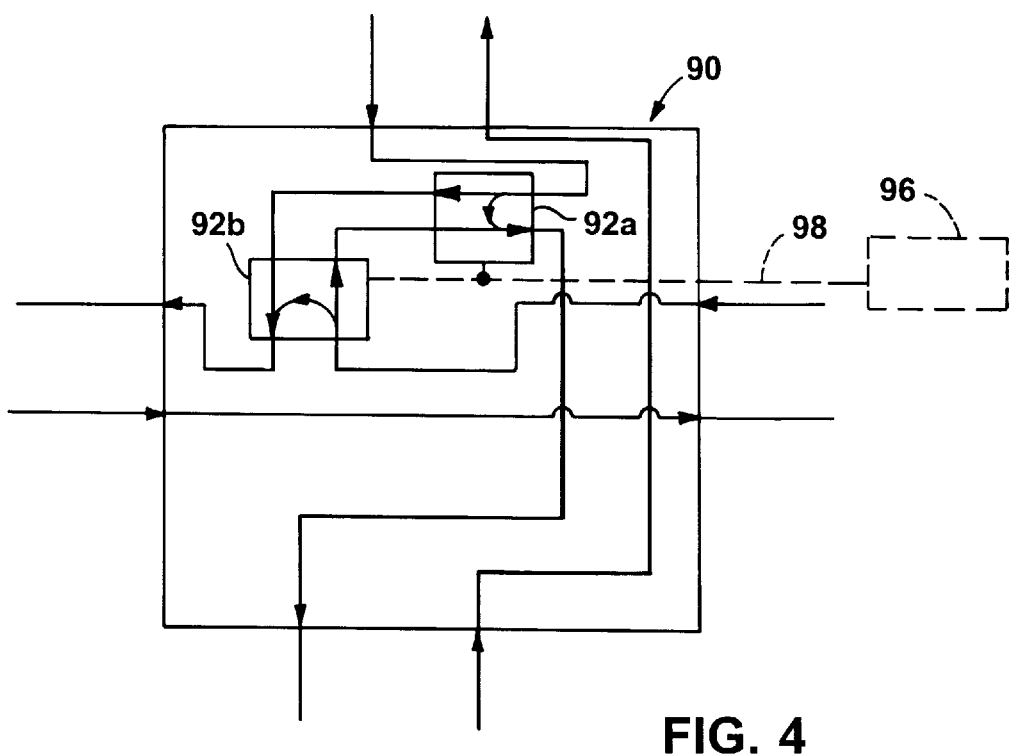
FIG. 4 is a detailed schematic of a switching circuit according to the invention.

Referring to FIG. 3, the LRCs can be interconnected into switching circuits 90 which together enable, in this illustrated embodiment, up to four controllers to control up to, for example, 64 disk drives with 16 disk drives being accommodated by each disk drive fibre channel loop. As illustrated in FIG. 4, each LRC circuit 90 includes two LRC bypass switches 92 connected back to back. Each LRC circuit in the switching circuit is controlled by the system software. The control interface consists, in the illustrated embodiment, of a register (of a controller CPU 96) which is connected to each of the LRC select lines 98. The select lines for each LRC pair at a switch node can be connected together as illustrated in FIG. 4 to provide the connection function of switching circuit 90. Alternatively, they could be left as two separate control lines. The select lines are thus controlled by the register which is written by the system CPU as needed.

Referring still to FIG. 3, each of the disk drive controllers 100a, 100b, 100c, 100d connects to one or more of the switching circuits 90 in a loop configuration. Similarly, each of the disk drive loops 102a, 102b, 102c, 102d connects to one or more of the switching circuits 90 in a loop configuration. In accordance with the software configuration set by a CPU 96, each of the controllers is thus connected for electrical signal communication with one or more of the disk drive loops through one or more switching circuits 90.

Referring to FIG. 4, in the illustrated embodiment of the invention, each of the switching circuits 90 is comprised of two LRCs 92. In one (the bypass) operating mode, the LRC 92a enables signals to pass through a vertical path (the disk drive loop) and LRC 92b enables signals to pass through the horizontal (controller loop) path. In a second (the through path) operating mode, the signals are intercepted by the circuit 90 which connects between a horizontal path (the disk drive controller loop) and a vertical path (the disk drive loop).

In this manner, under the software control of a CPU, any of the disk drive loops, which can typically have the configuration illustrated in FIG. 1, with or without the intermediate bypass switches depending upon the number of disk drives therein connected, can be controlled by any of the disk drive controllers 100a, 100b, 100c, 100d. This capability allows, in typical operation, the configuration of the circuit to be set prior to actual use, and further allows the flexibility of physically mapping from disk drive controllers to disk drives in order to support system expansion, modularity, and flexibility.

Referring still to FIG. 4, it is well known that many channel devices can have two communication ports. In such a case, it is desirable, in accordance with the invention, to provide redundancy, in the embodiment by also enabling the connection of each controller 100 to the second ports of all of the disk drives using drive loops 102. In this manner, in the event of a single port failure, the disk drive can be connected using its other port to the controllers so that communications do not fail.

Thus, additions, subtractions, and other modifications of the described particular embodiments of the invention will be apparent to those in this field and are within the scope of the following claims.

What is claimed is:

1. A fibre channel communications sub-system comprising a plurality of channel devices arranged in a plurality of channel loops, a plurality of channel controllers, a software controlled switching circuit electrically connecting the channel controllers to the fibre channel loops in varying selected configurations, said circuit comprising a plurality of switch elements arranged in a matrix-like configuration having controller loops connected to the channel controllers and drive loops connected to the channel devices, for selectively electrically connecting, under software control, each drive loop to a selected controller loop, and each switch element, in a first mode of operation, passing electrical communication signals in one through direction, and in a second mode of operation, passing electrical communication signals in a second bypass direction, whereby each drive loop is electrically connected to a selected one of said channel controllers.

2. The system of claim 1 wherein each switch element comprises a first and a second loop resiliency circuit interconnected to effect a cross-point switching capability.

3. A fibre channel disk drive sub-system comprising a plurality of disk drives arranged in a plurality of channel loops, a plurality of disk drive controllers, a software controlled switching circuit electrically connecting the disk drive controllers to the fibre channel loops in varying selected configurations, said circuit comprising a plurality of switch elements arranged in a matrix-like configuration having controller loops connected to the drive controllers and drive loops connected to the disk drives, for selectively electrically connecting, under software control, each drive loop to a selected controller loop, and each switch element, in a first mode of operation, passing electrical communication signals in one through direction, and in a second mode of operation, passing electrical communication signals in a second bypass direction, whereby each drive loop is electrically connected to a selected one of said disk drive controllers.

4. The system of claim 3 wherein each switch element comprises a first and a second bypass switch interconnected to effect a cross-point switching capability.

5. The system of claim 4 wherein each bypass switch is a loop resiliency circuit.

6. The system of claim 3 wherein each switch element comprises a first and second loop resiliency circuit, said loop resiliency circuits being connected back to back with bypass connections of each circuit being connected in a series bypass configuration with one of said controller loops and one of said drive loops.

7. The system of claim 3 further comprising each disk drive having a first communications port and a second communications port, and each port being in electrical communications with one of said drive loops.

* * * * *